No. 705,986.  
J. T. WEST.  
REIN GUARD.  
(Application filed July 10, 1901.)

(No Model.)

Patented July 29, 1902.

WITNESSES:  
J H Brophy  
J H D Acker

INVENTOR  
John T. West  
BY Munn & Co  
ATTORNEYS

UNITED STATES PATENT OFFICE.

JOHN THOMAS WEST, OF BOWLING GREEN, KENTUCKY.

REIN-GUARD.

SPECIFICATION forming part of Letters Patent No. 705,986, dated July 29, 1902.

Application filed July 10, 1901. Serial No. 67,710. (No model.)

*To all whom it may concern:*

Be it known that I, JOHN THOMAS WEST, a citizen of the United States, and a resident of Bowling Green, in the county of Warren and State of Kentucky, have invented a new and Improved Rein-Guard, of which the following is a full, clear, and exact description.

The purpose of the invention is to simplify the construction of rein-guards and to provide an article which may be conveniently attached to or detached from the harness and which will be light and durable and will not detract from the appearance of said harness, but will serve to effectually guide the reins and prevent them from becoming entangled with the tail of the horse and from catching in parts of the harness.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
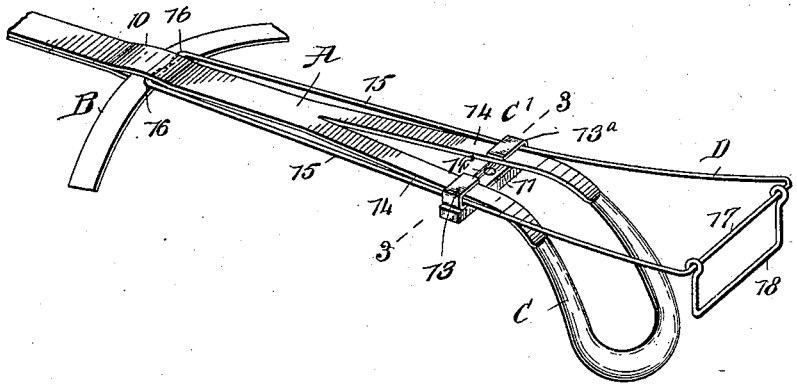
Figure 2:
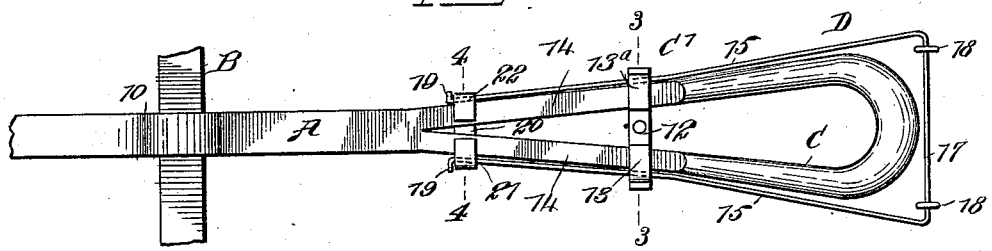
Figure 3:
Figure 4:
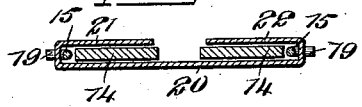
Figure 5:
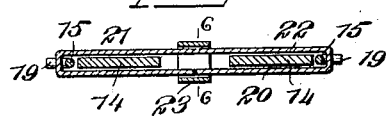
Figure 6:
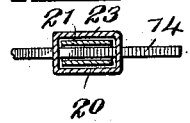

Figure 1 is a perspective view of the improved rein-guard and that portion of the harness to which the guard is applied. Fig. 2 is a plan view of the parts shown in Fig. 1, illustrating a slight departure in the manner of attaching a guard to a harness. Fig. 3 is an enlarged transverse section taken on the line 3 3 of Fig. 2. Fig. 4 is a transverse section on the line 4 4 of Fig. 2. Fig. 5 is a transverse section through a modified form of the device employed for attaching the forward ends of the rein-guard to the harness, and Fig. 6 is a transverse section taken practically on the line 6 6 of Fig. 5.

A represents a portion of the back-strap of a harness, B a portion of the hip-strap, which is passed through a loop 10 in the back-strap, and C represents the crupper, which is shown as a continuation of the back-strap. A guide device C' is located at the division of the crupper C or at a point near where the crupper connects with the back-strap. This guide device consists of a cross-bar 11, which is made of leather, rubber, or other material which will not chafe the back of the horse, since the cross-bar rests upon the animal. This cross-bar extends below the bifurcated portions 14 of the crupper C and beyond the outer side faces of the said members of the crupper, as is best shown in Figs. 1 and 2. A metal plate 12 is secured by rivets or other means on the upper face of the cross-bar 11 of the said guide device C', and this plate is provided at its ends with two guide arms or members 13 and 13ª, which are bent over the body portion of the plate 12 and in direction of each other. The members 14 of the crupper are passed through the space between the guide-arms 13 and 13ª and the body 12 of the plate, and side members 15 of the rein-guard D are likewise passed through the spaces between the guide-arms 13 and 13ª and the body of the plate 12 at the outside portions of the members 14 of the crupper, as is best shown in Fig. 3. These side members 15 of the rein-guard D diverge in direction of the rear, and the said members may be attached to the back-strap A in different ways. As shown in Fig. 1, the forward ends of the side members 15 of the rein-guard are provided with inwardly-extending arms or lugs 16, which enter the loop 10 in the back-strap.

The side members 15 of the rein-guard are connected at their rear ends by a cross-bar 17, and the said cross-bar 17 and side bars 15, together with their forward extensions 16, are preferably made from one piece of spring-wire of suitable gage, although a light metal bar may be used for the purpose.

A rein-support 18 is located at the cross-bar 17, and usually this rein-support is in the form of a downwardly-extending yoke pivotally attached to the rear cross-bar 17. The rein-guard D is of sufficient length to extend beyond the rear end of the crupper C, or so that the rein-support 18 will be beyond the rear end of the crupper or at a point above the crupper. It will be understood that the driving-reins are passed through the yoke 18.

In Fig. 2 I have illustrated another means of attaching the forward ends of the rein-guard to the back-strap or that portion of the crupper which connects with the back-strap. This connection consists of a plate 20, which is passed transversely beneath the back-strap or forward portion of the crupper, and the said plate, as shown in Fig. 4, is provided with two inwardly-extending guide-arms 21 and 22 at its end portions, the guide-arms extending over the upper face of the cross-bar or plate 20. The members 14 of the crupper pass through the spaces between the guide-arms 21 and 22 and the body of the plate, and the side members of the rein-guard D likewise pass through the said spaces, as is shown in Figs. 2 and 4. When the attaching device shown in Figs. 2 and 4 is employed, outward extensions 19 are provided at the forward ends of the side members of the rein-guard.

Another means of attaching the rein-guard to the harness is that shown in Figs. 5 and 6, in which a plate 20 is also employed and upper guide-arms 21 and 22; but these guide-arms are made to meet under and at a central point of lower plate, see cut, and the device is protected or reinforced at its center by a sleeve 23, and when used a leather strap is buckled around the cross-bar.

The rein-guard, if preferred, may have its forward or front ends to extend only to the cross-bar, and said front ends may link or hinge to outer ends of cross-bar or they may be only hooked or attached to the crupper, as may be preferred. The side arms of the guard may have a metal brace or braces to extend from 15 to 15, which numerals appear in Fig. 5, although the braces are not shown in the drawings.

I desire it to be understood that the rein-guard D may terminate at the cross-bar 11 and may be secured at that point in any approved manner.

Having thus described my invention, I claim as new and desire to secure by Letters Patent—

1. The combination with a divided crupper-strap and a crupper, of a rein-guide frame confined at its front end and having at its rear end a drop member which depends below the longitudinal plane of said frame, and a transversely-arranged confining-loop engaging with the members of said crupper in rear of the division in the crupper-strap, and forming a support for said rein-guide frame.

2. The combination with a divided crupper-strap and a crupper, of a rein-guide frame having the side bars extending forwardly from a rear drop member, and a confining-loop engaging with the side members of the crupper in rear of the division in the crupper-strap, and also engaging with the side bars of said frame, said side bars being confined against displacement relative to the parts by the side members of the crupper and by the end portions of said loop.

3. The combination with a divided crupper-strap and a crupper, of a rein-guide frame having side bars extending forwardly from a rear member, and a confining-loop slidably fitted to the side members of the crupper and to the side bars of said frame, said loop engaging with the crupper in rear of the division in the crupper-strap, and the side bars of the frame being held against displacement by the end portions of the loop and the side members of the crupper.

4. The combination with a crupper and a divided crupper-strap, of two loops disposed one in rear of the other and both engaging with the members of the crupper in rear of the division in the crupper-strap, and a rein-guide frame having side bars confined by and engaged with both of said loops, said side bars being provided with projections which engage the front loop and restrain said frame from rearward endwise movement.

5. The combination with a divided crupper-strap and a crupper, of a confining-loop engaging with said crupper-strap, a rein-guide frame having its side bars fitted between the members of the crupper-strap and the ends of the loop, and provided with projections arranged to fit against the loop and to restrain the frame from rearward endwise movement, and means engaging with the crupper and with the frame at a point intermediate of the length of the latter to support said frame in rear of said loop.

6. The combination with a crupper, of a confining-loop having its end portions doubled upon itself and forming keepers arranged to loosely receive the said members of the crupper, and a rein-guide frame having side bars extending forwardly from a rear member and fitted loosely within said confining-loop, said side bars being held from displacement by engaging with the members of the crupper and with the end portions of the loop.

In testimony whereof I have signed my name to this specification in the presence of two subscribing witnesses.

JOHN THOMAS WEST.

Witnesses:
C. WILBER,
R. N. GILLESPIE.